US007069138B2

(12) United States Patent
Böhnig et al.

(10) Patent No.: US 7,069,138 B2
(45) Date of Patent: Jun. 27, 2006

(54) METHOD FOR THE DRIFT COMPENSATION OF AN INJECTOR FOR THE DIRECT FUEL INJECTION IN A CYLINDER OF AN INTERNAL COMBUSTION ENGINE AS WELL AS A DEVICE

(75) Inventors: Ralf Böhnig, Regensburg (DE); Guy-Michel Cloarec, Obertraubling (DE); Christian Zimmer, Regensburg (DE)

(73) Assignee: Siemens Aktiengesellschaft, Munich (DE)

( * ) Notice: Subject to any disclaimer, the term of this patent is extended or adjusted under 35 U.S.C. 154(b) by 0 days.

(21) Appl. No.: 10/964,072

(22) Filed: Oct. 13, 2004

(65) Prior Publication Data

US 2005/0085990 A1 Apr. 21, 2005

(30) Foreign Application Priority Data

Oct. 21, 2003 (DE) ................................ 103 48 913
Dec. 15, 2003 (DE) ................................ 103 58 703
Aug. 23, 2004 (DE) ...................... 10 2004 040 770

(51) Int. Cl.
*B60T 7/12* (2006.01)

(52) U.S. Cl. ....................................... 701/104; 701/114

(58) Field of Classification Search ................ 701/102, 701/103, 104, 105, 115; 361/153
See application file for complete search history.

(56) References Cited

U.S. PATENT DOCUMENTS 4,426,980 A * 1/1984 Eisele et al. ................ 123/478
5,205,262 A * 4/1993 Anton et al. ................ 123/494
6,679,222 B1 * 1/2004 Reischl et al. .............. 123/305
6,779,511 B1 * 8/2004 Tonetti et al. .............. 123/480
2004/0089273 A1 * 5/2004 Tonetti et al. .............. 123/480

FOREIGN PATENT DOCUMENTS

DE 692 15 306 T2 4/1997
DE 197 00 711 C2 5/1999
DE 100 11 690 A1 9/2001
DE 101 45 188 A1 4/2003

* cited by examiner

*Primary Examiner*—John T. Kwon
(74) *Attorney, Agent, or Firm*—Baker Botts L.L.P.

(57) ABSTRACT

In the case of direct injection internal combustion engines, the problem occurs that especially the injection of a minimum amount of fuel depends in particular on different operating parameters such as the speed, the start of the injection or the rail pressure. Therefore, a method or a device is suggested in which a control unit (10) subdivides the complete range of values of at least one operating parameter into discrete sections. Subsequently, for each section, at least one operating point is specified for which a corresponding correction value depending on the operating parameter is determined and obtained. The correction value is then stored together with its corresponding operating point. This has the advantage that the correction value can be determined more accurately because interpolation can for example also be performed between two operating points.

17 Claims, 2 Drawing Sheets

METHOD FOR THE DRIFT COMPENSATION OF AN INJECTOR FOR THE DIRECT FUEL INJECTION IN A CYLINDER OF AN INTERNAL COMBUSTION ENGINE AS WELL AS A DEVICE

PRIORITY

This application claims priority to German Application No. 103 48 913.4 filed on Oct. 21, 2003; German Application No. 103 58 703.9 filed on Dec. 15, 2003; and German Application No. 10 2004 040 770.3 filed on Aug. 23, 2004.

TECHNICAL FIELD OF THE INVENTION

This invention is based on a method and a device for the drift compensation of an injector for the direct fuel injection into a cylinder of an internal combustion engine. It is already known that a control unit determines a correction value that serves to correct the injection particularly of a minimum amount of fuel. However, this correction value applies to a value range of an operating parameter depending on the injection duration of the internal combustion engine, for example the rotational speed, the start of injection or the rail pressure in a direct injection system such as the common rail system, the pump nozzle system or the like. A further problem is also seen in the fact that the correction value obtained is used for a complete value range. It is always used if one or several operating parameters of the internal combustion engine depending on the injection duration are within the range of values in question. If the operating point is found at the top or bottom limit of the value range, a specific adaptation is not carried out in this case.

DESCRIPTION OF THE RELATED ART

It is also critical that when determining a new correction value for a specific value range, this new correction value replaces the previous applicable correction value without it, for example, being necessary that a test is performed to determine whether this new correction value is more suitable than the old correction value. This can, for example, be important in the case of a multiple injection if a pre-injection or a post-injection was not duly discharged. In the case of undesirably too low or too high fuel injection, there can be disadvantageous operating modes. There can particularly be undesired exhaust gas and noise emissions that adversely affect the quiet running of the internal combustion engine, increase the fuel consumption or damage the internal combustion engine.

In addition, in the case of the known method for drift compensation of the injector, it also seems to be unfavorable that fuel pressure changes occurring in the rail are not taken into consideration. However, because the rail pressure in addition to the injection duration is a decisive factor when determining the amount of fuel to be injected, an error source is obtained here that can lead to unreliable injection results.

SUMMARY OF THE INVENTION

The object of the invention is to specify a method or a device that compensates more efficiently the injector drift particularly when injecting minimum amounts of fuel so that a more accurate fuel injection can reliably be carried out under all the operating conditions if possible. This object of the invention can be solved by a method for drift compensation of an injector for direct fuel injection into a cylinder of an internal combustion engine, comprising the steps of: for injecting a defined amount of fuel, determining and learning a correction value by a control unit compensating the drift of the injector that applies to one value range of at least one operating parameter of the internal combustion engine, and subdividing a complete value range of the at least one operating parameter into at least two discrete sections such that for at least one section and at least one operating point a correction value is determined and obtained depending on the at least one operating parameter.

The correction value together with a corresponding operating point and/or additional information can be stored in the form of a table or performance characteristics. The operating point of the internal combustion engine may remain constant when the correction value is calculated. During normal driving for determining the correction value, an interpolation may take place between two value pairs that have been obtained. The interpolation result can be checked to determine whether or not the interpolated correction values lie between the limits that can be calibrated. The correction values can be determined depending on a rotational speed of the internal combustion engine and/or a start of the injection and/or in a direct injection system on a rail pressure. The step of learning can be activated during normal driving of the vehicle if a matching operating point has been reached. When injecting a minimum amount of fuel, drift-compensating correction values can be determined and learned for a minimum injection duration of the injector. A new correction value can be determined for the running adaptation of a section and the new correction value can be tested for validity by comparing it with the current average value of all the correction values previously learned in the specific section and can only be learned if there are criteria that can be specified. The new correction values can be tested in each case to determine whether or not a deviation from a current average value is below a limit that can be calibrated. The validity check can only be activated after a minimum number of correction values which have already been learned from the section in question can be specified. A specific section of the value range can be specifically activated for the adaptation if, over and above a period that can be specified, no or no new correction value was learned.

The object can also be achieved by a device for the drift compensation of an injector comprising a control unit for determining at least one correction value depending on one operating parameter and with a memory for the at least one correction value, wherein the control unit is operable by an algorithm by means of which the at least one correction value can be determined in at least one section of a value range subdivided into at least two discrete sections for at least one operating point.

The algorithm of the control unit can be embodied to either determine a suitable correction value by interpolation or by reading from the memory and to correct accordingly the injection duration of the injector for a current operating point of the internal combustion engine.

For the method according to the invention for the drift compensation of an injector for direct fuel injection into a cylinder of an internal combustion engine or for the device it is advantageous that in a range of values the at least one operating point taken into account of the internal combustion engine can be set at random. In this way, for example, one correction value can be determined in each case for one operating point at the top, middle and bottom value range of the operating parameter. Therefore, particularly advantageous is the fact that the correction values determined are stored together with their operating points and are obtained to that end. If an internal combustion engine is at precisely such a stored operating point, then the appropriate correction value can easily be read from the memory and used for the correction of the injection duration of the injector. By means of the correction method according to the invention, injection amounts can be corrected individually for each cylinder of the internal combustion engine. As a result, series scattering of the injectors and also the engines are automatically compensated for in an advantageous manner. Worth mentioning here is also the fact that the passive design of the system considerably reduces the calibration costs.

The measures given in the dependent claims are advantageous further developments and improvements of the method or the device. Keeping the operating point constant on making the calculation is considered as particularly advantageous. As a result, the correction value can be determined more accurately for example over several injection cycles so that the correction can be carried out more reliably.

In addition it has proved very advantageous that a very efficient correction with a high accuracy can be achieved if to determine the correction value during normal driving of the vehicle interpolation can be performed between two learned value pairs. Because the support points can be selected freely for the interpolation, the correction value can in this way be adapted optimally to such ranges that for example have a high range dependency on an operating parameter. The interpolation results in both accurate adaptive interpolation performance characteristics and the application of discrete values that are only assigned to one complete range. In particular, the smallest amounts of fuel can be adapted more reliably and with greater accuracy in this way.

A particularly favorable solution is the fact that the result for the interpolated correction value is subsequently tested. Thus, it is determined whether or not the correction measure was successful and the new correction value obtained fits better than the old correction value.

Several operating parameters have a different influence on the injection of a specific amount of fuel. Particularly in the case of very small injection amounts there are relatively high inaccuracies because the opening times of the injector in this range are exceptionally short and, therefore, difficult to control. Therefore, it is especially important that the speed of the internal combustion engine is kept constant during the injection.

An additional advantage also lies in determining the correction value depending on the start of the injection. Depending on the start of the injection, the pressure ratios change particularly in the rail so that, as a result, a changed injection amount can easily be obtained.

Thus, the injected amount of fuel can also be influenced negatively to an undesired extent by the fact that the rail pressure during the determination of the correction value is not kept constant. Depending on the volumes of the buffer store in the high pressure range and the opening time of the injector valve, the rail pressure is subject to wide fluctuations that can exert a corresponding negative influence on determining the correction value.

In addition, activating the learning process during normal driving of the vehicle is also an advantage. Therefore, this ensures that an optimum correction of the fuel injection can be carried out at any time, even in such cases where no suitable correction value is available.

In the device it is advantageous at a currently available operating point of the internal combustion engine to either determine an appropriate correction value by interpolation or by reading from the memory and to correct the injection duration of the injector accordingly.

BRIEF DESCRIPTION OF THE DRAWINGS

An embodiment of the invention is explained in greater detail on the basis of the accompanying drawings.

DETAILED DESCRIPTION OF THE PREFERRED EMBODIMENTS

Figure 1:
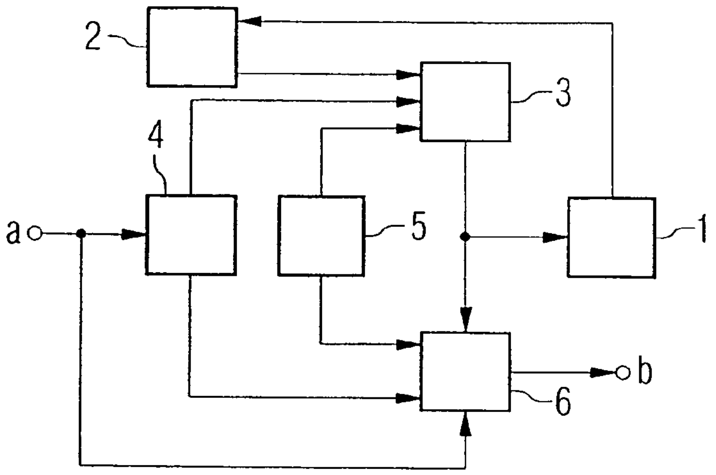
FIG. 1 shows a block schematic of a method according to the invention, by means of which a drift compensation of the injector can be carried out.

FIG. 1 shows the basic functioning of the method for the drift compensation of an injector according to the invention on the basis of a block schematic. Drift compensation is designed in such a way that it can be adapted to the injection system. Its functioning is explained below using the rail pressure p_Rail in a direct injection system of a common rail system that as dependent operating parameters of the internal combustion engine can influence the injection duration of the injector and, with that, can influence the injected amount of fuel through the rail pressure-dependent drift of the injector in an undesired way. Alternatively it is also provided that additional operating parameters such as the start of the injection t_Start, the rotational speed U_min of the internal combustion engine, etc. are used individually or in combination for the drift compensation because these parameters can also influence the current operating mode of the internal combustion engine.

An essential element of the method according to the invention according to FIG. 1 is a manager unit 1 that is embodied with a corresponding algorithm. The manager unit 1 basically has a program-controlled control unit which will be explained further below.

The manager unit 1 is connected to a memory in which the correction values obtained are stored together with the corresponding operating point values of considered operating parameters preferably in the form of a table or performance characteristics 2. The values can for example be organized or stored according to the ordering structure of the consecutive sections in the value range as a correction value vector and a parameter vector. A similarly organized mean value vector and an adaptation number vector can also be included here. These values or vectors are determined particularly by correcting a minimum injection amount (MFMA=minimum mass fuel adaptation) as is for example required in the partial load range or in the case of a pre-injection or a post-injection.

For the method according to the invention, three different possibilities are provided that can be selected by a mode selection 5:

The first way leads from the mode selection 5 to the learning mode 3 and pertains to the case whereby, if a suitable operating point has been reached, the learning process can be activated. For that, for the current operating mode of the internal combustion engine, the corresponding values are taken from the performance characteristics 2 and given together with the operating parameters divided into sections in unit 4 adjacent to input a, to a learning mode 3 with a validity check. An acceptable new correction value is then available, if required indirectly, via an interpolation unit 6 for the operating parameter-dependent compensation of the injector drift or for storage purposes.

The second way, taking the mode selection 5 as a starting basis, pertains to the special case that the manager unit 1 then specifically activates a certain section of the value range in order to determine a correction value there without a validity check, if required.

The third way leads from the mode selection 5 to the interpolation unit 6 and pertains to the case that in the operating mode for a current operating point of for example 300 bars rail pressure an additional correction value is required, however, for example only in the section 200 to 300 bars, at operating point B_Pkt (e.g. 250 bars) there is a current correction value of 0.4 and in the section 300 to 400 bars, at the operating point 360 bars an additional current correction value of 0.6. The correction value for 300 bars can then be interpolated advantageously from the two closest value pairs.

A unit 4 is connected in series to the two units 3 and 6 for section indexing 4 by means of which the value range of a considered operating parameter is subdivided into a random number of different sections for example ten sections, if required. At input a of unit 4, a current measured value of the operating parameter, in our example the rail pressure p_Rail is applied that is made available from a corresponding pressure sensor in a prepared form. At the same time the current measured value reaches the interpolation unit 6 and can be processed further here during the interpolation in a suitable way. At an output b of the interpolation unit 6, the current correction value determined or a corresponding offset value can then be read off and can be used for the drift compensation of the injector. Strictly speaking this new correction value only applies to one representative operating point of the internal combustion engine, however, in this case to the given section. By interpolating neighboring values that were stored for a similar operating point beforehand, the new correction value can be adapted almost as accurately as required.

Below, the detailed functioning of the method shown in FIG. 1 is explained in greater detail. First of all, the complete value range of the dependency value, i.e. the considered dependent operating parameter in unit 4 is subdivided into a specified number of discrete sections for section indexing. As a result, the number of sections can be specified as a function of the sensitivity of the drift referring to the operating parameters. If on the one hand, the sensitivity of the operating parameter is to be increased, a higher number of sections are selected. If on the other hand, the dependency is to be reduced, a lower number of sections are selected. For example, in practice the ranges from 0 to 300 bars and from 700 to 1000 bars rail pressure can also be assigned more closely to sections than the completely unassigned range lying in between, if required.

For each section, at least one operating point is specified for which a corresponding correction value is determined and obtained. Alternatively, a corresponding correction value is determined and obtained for several sections if a suitable operating mode has just been achieved, at any rate lying within the specific section. It has advantageously been proven that on calculating the correction value, the specific operating point of the internal combustion engine is always kept constant. The correction value is then stored together with the specific operating point in Table 2. For the calculating period of typically less than one second, the control unit can be kept constant. Should the driver of the vehicle intervene in such a short period, a desired output of the control unit while maintaining the constancy of the operating parameters in the combustion point can be achieved as an approximation by changing other parameters, but the calculation can be abandoned. If, for example, a specific operating mode is not reached when starting up, the control unit can for the short term in an artificial way increase the rail pressure p_Rail if this conforms to the other conditions.

During normal driving, the mode selection 5 has activated the interpolation unit 6 so that between two stored adjacent value pairs, an optimum new correction value can be determined. In this case, care is taken in which part of the section the current operating point of the internal combustion engine is at that precise moment.

If learned correction values have not been obtained for all the sections, then the two closest values are automatically taken for the interpolation and a linear interpolation can be carried out according to the known computer rules. A subsequent test is carried out to determine whether or not the result value for the new correction value is within limits that can be calibrated.

If, for example, only one correction value is available, then an alternate provision must be made for the case in which a specific value must be used for all the ranges. If there is no value, then the correction value is set to the neutral value. These boundary conditions can particularly be used when pre-calibrating Table 2.

If there already are correction values for a specific section of the value range, the newly obtained value undergoes a validity check with the specific average value, in which case with the new previous average value and the specific number of previously obtained values, a new average value is calculated and stored. As a result, a functional diagnosis of the correction value calculation is also achieved.

For example, in the rail pressure section of 200 to 300 bars in the case of at least one operating point lying in this section, a correction value of 0.4; 0.5 up to finally 0.6 can be determined consecutively. For example, as criterion for the validity check, a maximum deviation of 0.3 should be specified. The second-determined correction value of 0.5 only deviates from the first-determined correction value of 0.4 within the permitted limits so that, on the one hand, 0.5 is obtained as the new correction value for this section and, on the other hand, the updated average value of now 0.45 is stored together with the adaptation number (here: 2). In the next cycle, the third-determined correction value of 0.6 is compared with the current average value of 0.45. Its deviation (here: 0.15) is less than the specified deviation (here: 0.3). Consequently, its new correction value of 0.6 is accepted. From the average value of 0.45 with an associated adaptation number of 2 and a new correction value of 0.6 it is then possible to calculate a new, updated average value of 0.5 (with associated adaptation number of 3) according to the formula for the arithmetic average value.

During storage, invalid values are replaced with new values after it was determined that the new values fit better than the old values.

The result of the old and new correction value determined is made available at the output b of the interpolation unit 6 and can be used to control the injector.

The system is provided with a manager that monitors the number of correction values for a specific section. If no correction values were calculated in a section over a longer period, then this section is specifically activated for adaptation purposes. If this is not possible or is not desired, an internal display is also for example possible that in this range a partially unreliable engine control is given.

The method can be carried out very easily and quickly so that it can also be used to control an individual cylinder.

Figure 2A:
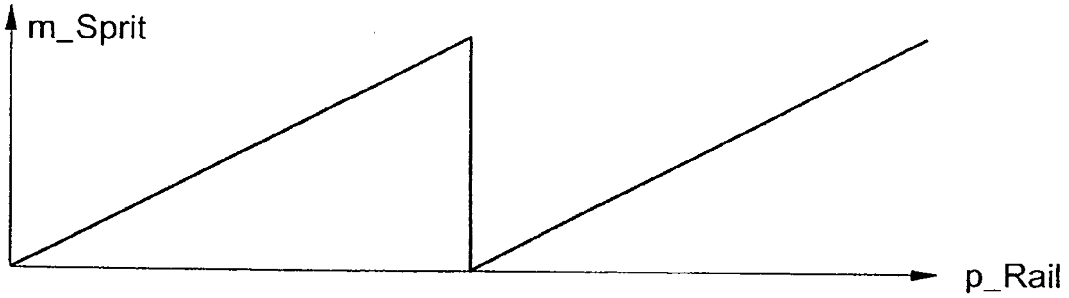
FIGS. 2A to 2C show three diagrams with correction values dependent on the parameters can be determined.
Figure 2B:
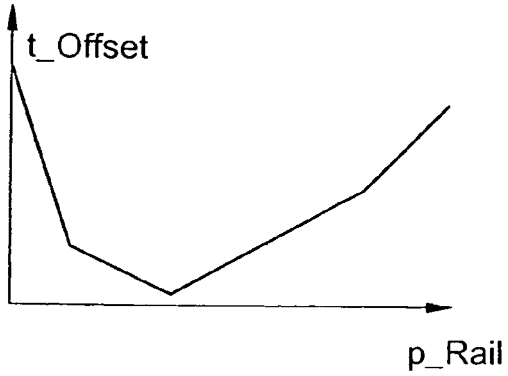
Figure 2C:
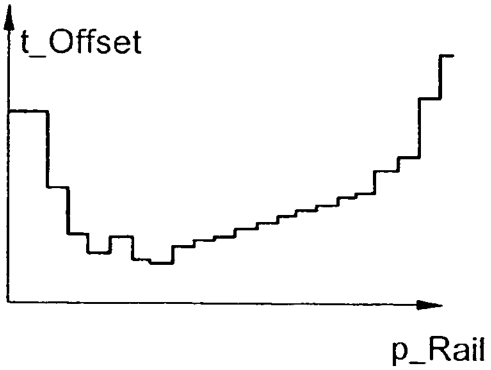

FIGS. 2A to 2C show three diagrams by means of which, for the above-mentioned embodiment, the correction value for compensation of the injector drift can be determined depending on the rail pressure according to the invention. The amount of fuel m_Sprit to be injected is plotted on the y-axis of FIG. 2A. On the other hand, on the y-axis of FIGS. 2B and 2C, the offset (correction value) of the minimum injection duration of the injector t_Offset is plotted. On the x-axis of FIGS. 2A to 2C, the rail pressure p_Rail is plotted. A linear ramp function is shown in FIG. 2A. In it, two saw teeth can for example be identified, the flank of which inclines with increasing time. The left saw tooth is assigned to the diagram of FIG. 2B below diagram 2A. In terms of the diagram in FIG. 2B, the case is considered in which the mode selection 5 has changed over to the learning mode 3.

The diagram of FIG. 2C is assigned to the second saw tooth of FIG. 2A. Here, the case is considered in which the mode selection 5 has changed over to the interpolation unit 6.

In principle, the ramp function of FIG. 2A determines the operating point of a value range at which the internal combustion engine currently finds itself and must be determined for the correction value for the drift correction of the injector to be determined. The diagram of FIG. 2B is assigned to the first saw tooth of FIG. 2A. It shows in the learning mode 3 as the learning curve, a key-shaped offset curve that was initially determined and stored beforehand for the correction of the injection duration of an injection pulse by using the algorithm. Depending on the operating point it is now possible to read the corresponding correction curve (offset value) from the curve of FIG. 2B. The diagram can particularly be used for the adaptation of a minimum amount of fuel.

An alternative solution for determining the correction value is shown in FIG. 2C. In the case of this correction curve, interpolation took place between two stored operating points during normal driving operation. The individual steps that can be identified on the curve are obtained as a result of the duration of the calculation for determining the offset value. In principle, this curve has the same shape as the curve in FIG. 2B.

Figure 3:
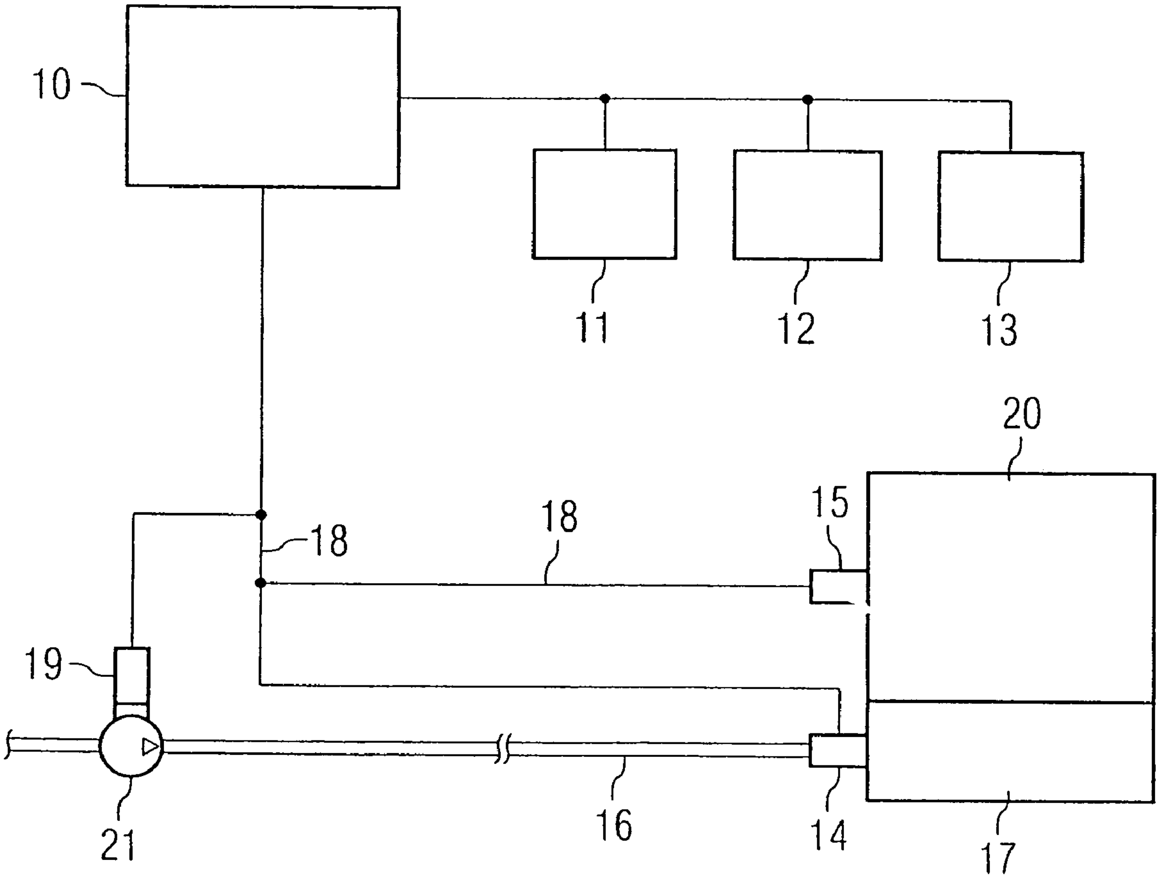
FIG. 3 shows a simplified block schematic of a device for drift compensation according to the invention.

In the case of the wiring diagram of FIG. 3, a control unit 10 is provided in which the above-mentioned manager is implemented with the algorithm according to the invention. The control unit 10 has a programmable computer with all the required units. It is particularly connected to a program memory 11, a memory 12 for the algorithm and a memory 13 for the correction values. In this case, the correction values are preferably stored in the form of a table or performance characteristics together with additionally assigned parameter values.

The control unit 10 is connected preferably via a data and control bus 18 to at least one injector 14 that is arranged at a suitable place in the internal combustion engine 20 in the area of a cylinder 17. The injector 14 is preferably embodied with a piezoelectric actuator that can be activated via the data and control bus 18.

The injector 14 is connected to the high-pressure line (rail) 16 that is filled with fuel that is under a high pressure, for example petrol, diesel or gas. The high pressure in rail 16 is generated by a regulated pump 21. A pressure sensor 19 on the pump 21 or the rail then detects the current rail pressure.

In addition, at the internal combustion engine 20, a knock sensor 15 is arranged by means of which, amongst others, the combustion noise is detected and from this the start of the injection or the actually injected amount of fuel can for example be determined. Additional sensors, for example, a rotational speed sensor for detecting the rotational speed of the internal combustion engine, etc. can also be provided.

Therefore, the system is cylinder-individual and for example makes possible the compensation of injector scattering. The implementation of the system is generic, thus it can be used for the compensation of different as well as several dependencies. Adaptation to the specific dependency takes place purely via calibration.

We claim:

1. A method for drift compensation of an injector for direct fuel injection into a cylinder of an internal combustion engine, comprising the steps of:

for injecting a defined amount of fuel, determining and learning a correction value by a control unit, the correction value operable to compensate for drift of the injector that applies to one value range of at least one operating parameter of the internal combustion engine, and subdividing the value range of the at least one operating parameter into at least two discrete sections such that for at least one section and at least one operating point a correction value is determined and obtained depending on the at least one operating parameter, determining a new correction value for the running adaptation of the at least one section and testing the new correction value for validity by comparing the new correction value with the current average value of all the correction values previously learned in the at least one section.

2. The method according to claim 1, wherein the correction value together with a corresponding operating point and/or additional information is stored in the form of a table or performance characteristics.

3. The method according to claim 1, wherein the operating point of the internal combustion engine remains constant when the correction value is calculated.

4. The method according to claim 1, wherein during normal driving for determining the correction value, an interpolation takes place between two value pairs that have been obtained.

5. The method according to claim 4, wherein an interpolation is carried out between the two closest value pairs if no usable value pairs have been stored.

6. The method according to claim 4, wherein the interpolation result is checked to determine whether or not the interpolated correction values lie between the limits that are operable to be calibrated.

7. The method according to claim 5, wherein the interpolation result is checked to determine whether or not the interpolated correction values lie between the limits that are operable to be calibrated.

8. The method according to claim 1, wherein the correction values are determined depending on a rotational speed of the internal combustion engine and/or a start of the injection and/or in a direct injection system on a rail pressure.

9. The method according to claim 1, wherein the step of learning is activated during normal driving of the vehicle if a matching operating point has been reached.

10. The method according to claim 1, wherein when injecting a minimum amount of fuel, drift-compensating correction values are determined and learned for a minimum injection duration of the injector.

11. The method according to claim 1, wherein the new correction values are tested in each case to determine whether or not a deviation from a current average value is below a limit that are operable to be calibrated.

12. The method according to claim 1, wherein the validity check is only activated after a minimum number of correction values which have already been learned from the section in question are specified.

13. The method according to claim 11, wherein the validity check is only activated after a minimum number of correction values which have already been learned from the section in question are specified.

14. The method according to claim 1, wherein a specific section of the value range is specifically activated for the adaptation if, over and above a specified period, no correction value or no new correction value was learned.

15. A device for the drift compensation of an injector comprising:

a control unit for determining at least one correction value depending on one operating parameters;

a memory associated with the control unit for storing the at least one correction value;

wherein the control unit is operable to determine at least one value range of correction values by an algorithm, the correction value range subdivided into at least two discrete sections for at least one operating point wherein the control unit is further operable to determine a new correction value for the running adaptation of the at least one section and test the new correction value for validity by comparing the new correction value with the average value of all the correction values previously determined for the at least one section.

16. The device according to claim 15, wherein the algorithm of the control unit is embodied to determine a suitable correction value by interpolation and to correct accordingly the injection duration of the injector for a current operating point of the internal combustion engine.

17. The device according to claim 15, wherein the algorithm of the control unit is embodied to determine a suitable correction value by reading from the memory and to correct accordingly the injection duration of the injector for a current operating point of the internal combustion engine.

* * * * *